(12) United States Patent
Oommen et al.

(10) Patent No.: US 10,827,246 B1
(45) Date of Patent: Nov. 3, 2020

(54) AUDIO DEVICE

(71) Applicant: Bose Corporation, Framingham, MA (US)

(72) Inventors: Binu Oommen, Franklin, MA (US); David Fustino, Worcester, MA (US); John Benton, Northbridge, MA (US); Prateek Nath, Southborough, MA (US); Kai Gao, Natick, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/519,220

(22) Filed: Jul. 23, 2019

(51) Int. Cl.
*H04R 1/10* (2006.01)
*F03G 7/06* (2006.01)
*A47C 7/38* (2006.01)

(52) U.S. Cl.
CPC ........... *H04R 1/1008* (2013.01); *H04R 1/105* (2013.01); *H04R 1/1041* (2013.01); *H04R 1/1091* (2013.01); *A47C 7/38* (2013.01); *F03G 7/065* (2013.01); *H04R 1/1066* (2013.01); *H04R 2460/09* (2013.01)

(58) Field of Classification Search
CPC .. H04R 1/1008; H04R 1/1041; H04R 1/1091; H04R 2460/09; H04R 1/1066; G10L 5/103; F03G 7/065; A47C 7/38
See application file for complete search history.

(56) References Cited

U.S. PATENT DOCUMENTS

| 5,303,105 | A | * | 4/1994 | Jorgenson | G11B 5/596 360/244.2 |
| 6,449,374 | B1 | * | 9/2002 | Skulley | H04R 1/083 381/330 |
| 7,106,877 | B1 | * | 9/2006 | Linville | H04R 1/105 381/370 |
| 2002/0142119 | A1 | * | 10/2002 | Seward | A61L 31/128 428/36.9 |
| 2003/0222635 | A1 | * | 12/2003 | Jacobsen | G02B 6/12002 324/106 |
| 2009/0008973 | A1 | * | 1/2009 | Browne | B60N 2/806 297/216.12 |

(Continued)

OTHER PUBLICATIONS

Unpublished U.S. Appl. No. 16/275,604, filed Feb. 14, 2019; Applicant: Bose Corporation.

(Continued)

*Primary Examiner* — Davetta W Goins
*Assistant Examiner* — Kuassi A Ganmavo
(74) *Attorney, Agent, or Firm* — Brian M. Dingman; Dingman IP Law, PC

(57) ABSTRACT

A wearable audio device includes a body configured to be worn on or abutting an outer ear of a user. The body is configured to contact at least one of the outer ear and the portion of the head that abuts the outer ear. The body comprises at least at a first portion proximate the upper region of the outer ear helix and a second portion proximate the otobasion inferius. At least one of the first and second portions of the body are configured to change shape upon application of a predetermined stimulus. An acoustic module is carried by the body and is configured to locate a sound-emitting opening proximate the user's ear when the body is worn on or abutting the ear of the user.

18 Claims, 6 Drawing Sheets

(56) References Cited

U.S. PATENT DOCUMENTS

| | | | | |
|---|---|---|---|---|
| 2009/0116678 | A1* | 5/2009 | Bevirt | H04M 1/05 |
| | | | | 381/381 |
| 2010/0061582 | A1* | 3/2010 | Takigawa | H04R 1/1041 |
| | | | | 381/380 |
| 2010/0275592 | A1* | 11/2010 | Topliss | G03B 5/00 |
| | | | | 60/528 |
| 2014/0316456 | A1* | 10/2014 | Ando | A61H 7/004 |
| | | | | 606/204 |
| 2017/0094389 | A1* | 3/2017 | Saulsbury | A61B 5/6817 |
| 2018/0279034 | A1* | 9/2018 | Reynolds | H04R 1/1041 |
| 2018/0376236 | A1* | 12/2018 | Prevoir | H04R 1/1016 |
| 2020/0037076 | A1* | 1/2020 | Boulanger | H04R 1/1041 |

OTHER PUBLICATIONS

Unpublished U.S. Appl. No. 15/901,076, filed Feb. 21, 2018; Applicant: Bose Corporation.

* cited by examiner

AUDIO DEVICE

BACKGROUND

This disclosure relates to an audio device that is configured to be worn on the body.

Audio devices that are worn on the body, such as earphones that are carried on the ear, need to fit well and be easy to put on and take off. For example, the device should remain in place as the person moves, be comfortable to wear, and maintain the transducer at a desired location relative to the ear. Since human anatomy differs dramatically from person to person, these objectives are difficult to achieve.

SUMMARY

All examples and features mentioned below can be combined in any technically possible way.

In one aspect, a wearable audio device includes a body configured to be worn on or abutting an outer ear of a user, wherein the body is configured to contact at least one of the outer ear and the portion of the head that abuts the outer ear, wherein the body comprises at least at a first portion proximate the upper region of the outer ear helix and a second portion proximate the otobasion inferius, and wherein at least one of the first and second portions of the body are configured to change shape upon application of a predetermined stimulus. An acoustic module is carried by the body and is configured to locate a sound-emitting opening proximate the user's ear when the body is worn on or abutting the ear of the user. The body may be configured to contact the back of a pinna of the user. The body may have a predefined maximum shape change. The stimulus may be electrically induced. The stimulus may be heat.

Examples may include one of the above and/or below features, or any combination thereof. The wearable audio device may further comprise a control system that is configured to control the application of an electrically-induced stimulus to the body. The control system may comprise a control loop comprising a sensor and a controller, responsive to the sensor, for controlling the application of the electrically-induced stimulus to the body. The sensor may be selected from the group of sensors consisting of a force sensor, a capacitive sensor, a current sensor, an optical sensor, and an infrared sensor. The wearable audio device may further comprise a memory for storing a determined electrically-induced stimulus.

Examples may include one of the above and/or below features, or any combination thereof. The body may comprise a shape memory material configured to change shape upon the application of heat. Heat may be applied to the shape memory material by resistive heating. Each of the first and second portions of the body may comprise shape memory material. The wearable audio device may further comprise a spring that is configured to have an effect on the shape change. The shape memory material may comprise at least one of a shape memory metal alloy and a shape memory polymer. The shape memory material may comprise both a shape memory metal alloy and a shape memory polymer. A polymer may encapsulate at least some of the shape memory alloy, to help retain a support structure shape.

Examples may include one of the above and/or below features, or any combination thereof. The body may comprise a protrusion that is configured to contact an ear root dimple of the user. The protrusion may comprise shape memory material. The protrusion may be coupled to a support structure that is configured to be moved along a length of the body. The wearable audio device may further comprise a sensor that is configured to determine a position of the support structure relative to the body. The sensor may comprise a capacitive-based position-sensing device.

In another aspect, a wearable audio device includes a body configured to be worn on or abutting an outer ear of a user, wherein the body is configured to contact at least one of the outer ear and the portion of the head that abuts the outer ear, wherein the body comprises at least at a first portion proximate the upper region of the outer ear helix and a second portion proximate the otobasion inferius, and wherein at least one of the first and second portions of the body comprises a shape memory material that is configured to change shape upon the application of heat. An acoustic module, carried by the body, is configured to locate a sound-emitting opening proximate the user's ear when the body is worn on or abutting the ear of the user. A control system is configured to control the application of an electrical current to the shape memory material, to cause resistive heating of the shape-memory material.

DETAILED DESCRIPTION

Figure 1:
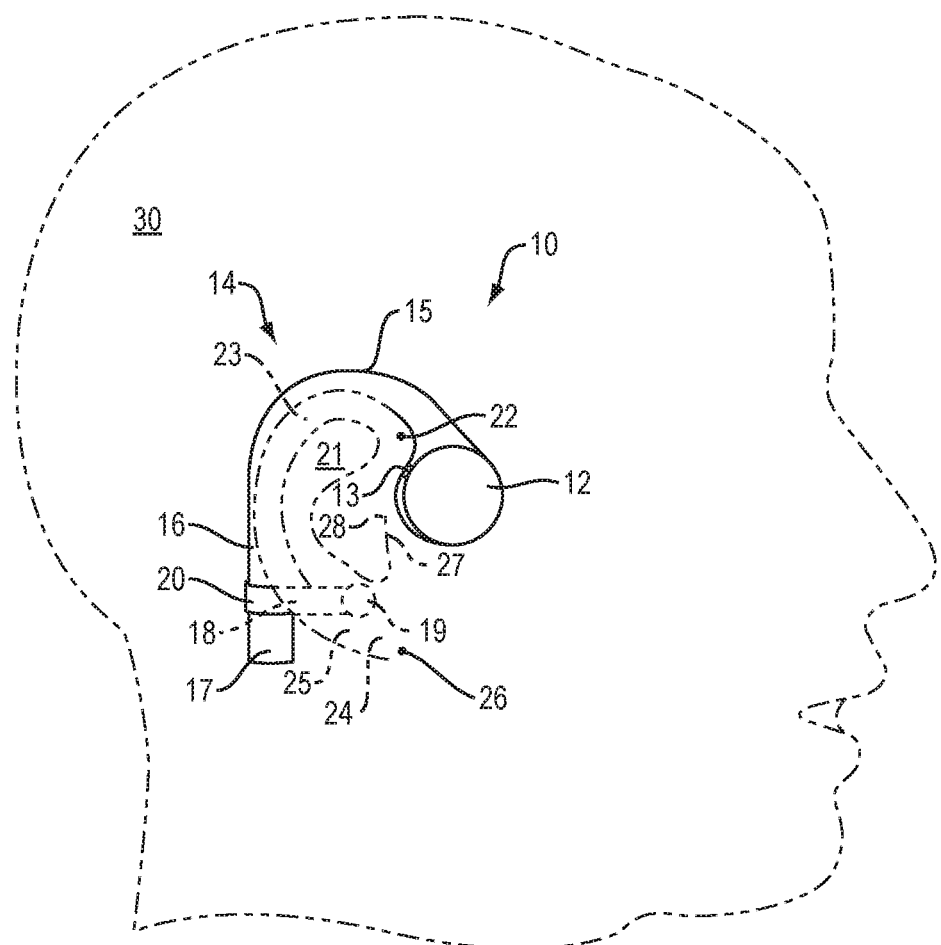
FIG. 1 illustrates an open audio device carried on an ear of a user.

The present audio device is configured to be carried on the body of a user. Examples of the audio device include (but are not limited to) open audio devices in which the transducer output is directed into the air (while leaving the ear canal open to the surrounding environment), as opposed to a closed device wherein the transducer output is directed into the ear canal, or into an enclosed volume over the ear as with some headphones. The audio device includes an electro-acoustic transducer. A support structure or wearable audio device body directly or indirectly carries the transducer. The support structure is configured to change shape upon application of a predetermined stimulus. The stimulus typically results in heating of at least a portion of the support structure. The shape change can be used to help fit the audio device to the body of the user. This helps the audio device to fit well on people with different anatomies. In one non-limiting example the audio device is an earphone that is carried on an ear of the user and configured to locate the transducer close to but (typically but not necessarily) not in the ear canal. The shape change features can be used to fit the device to varied ear anatomies.

This disclosure in part describes a type of open audio device with one or more electro-acoustic transducers that are located off of the ear. A headphone refers to a device that typically fits around, on, or in an ear and that radiates acoustic energy into the ear canal. Headphones are sometimes referred to as earphones, earpieces, headsets, earbuds, or sport headphones, and can be wired or wireless. A headphone includes an electro-acoustic transducer (driver) to transduce audio signals to acoustic energy. The acoustic driver may or may not be housed in an earcup. The figures and descriptions following in some cases show a single open audio device. A headphone may be a single stand-alone unit or one of a pair of headphones (each including at least one acoustic driver), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality, such as a microphone.

In an around the ear or on the ear or off the ear headphone, the headphone may include a headband or other support structure and at least one housing or other structure that contains a transducer and is arranged to sit on or over or proximate an ear of the user. The headband can be collapsible or foldable, and can be made of multiple parts. Some headbands include a slider, which may be positioned internal to the headband, that provides for any desired translation of the housing. Some headphones include a yoke pivotally mounted to the headband, with the housing pivotally mounted to the yoke, to provide for any desired rotation of the housing.

An open audio device includes but is not limited to off-ear headphones (i.e., devices that have one or more electro-acoustic transducers that are coupled to the head or ear (typically by a support structure) but do not occlude the ear canal opening), and audio devices carried by the upper torso, e.g., the shoulder region. In the description that follows the open audio device is depicted as an off-ear headphone, but that is not a limitation of the disclosure as the electro-acoustic transducer can be used in any device that is configured to deliver sound to one or both ears of the wearer where there are no ear cups and no ear buds.

FIG. 1 illustrates an example of an open audio device 10 that is configured as an open audio earphone. Audio device 10 comprises audio device body 14 that is configured to be carried on the ear pinna and/or the head at or proximate the ear root region where the pinna meets the head. Audio device 10 also comprises portion 12 (which may be an acoustic module) that comprises an electro-acoustic transducer (not shown in the drawing). The transducer delivers sound pressure from portion 12 directed generally toward the ear canal opening 28 that is proximate ear tragus 27. Open audio devices that are configured to be carried on or proximate the ear in a similar manner are disclosed in U.S. patent application Ser. No. 15/901,076 filed on Feb. 21, 2018 and U.S. patent application Ser. No. 16/275,604 filed on Feb. 14, 2019. The entire disclosures of these two patent applications are incorporated herein by reference for all purposes.

Audio device 10 is held on the ear and/or the head at least in part by a clamping force of audio device body 14 on the ear and/or the head. Clamping forces that are appropriate to hold an audio device on the body in this manner are further described in the patent applications incorporated by reference herein. Such clamping forces are generally but not necessarily applied on generally diametrically-opposed locations of the pinna, such as near the top and bottom of the pinna. Audio device body 14 is configured to grip the ear and/or the head at these regions.

Exemplary audio device 10 is depicted mounted to an ear in FIG. 1. Audio device 10 is carried on or proximate outer ear 21. Audio device 10 comprises acoustic module 12 that is configured to locate a sound-emitting opening 13 anteriorly of and proximate to the ear canal opening 28, which is behind (i.e., generally underneath) ear tragus 27. Acoustic modules that are configured to deliver sound to an ear are well known in the field and so are not fully described herein. Audio device body 14 carries acoustic module 12 and is configured to be worn on or abutting outer ear 21 such that body 14 contacts the outer ear and/or the portion of the head 30 that abuts the outer ear. Arm 18 is coupled to body 14. Arm 18 comprises a distal end 19 that is configured to contact the ear root dimple 25 of the user. Arm 18 can be (but need not be) configured to be moved in two directions along the length of body 14. Arm 18 may or may not be compliant.

Body 14 can at least in part be shaped generally to follow the ear root, which is the intersection of the outer ear and the head. Contact along the ear root, or the outer ear and/or the head abutting the ear root (collectively termed the ear root region), can be at one or more locations along the ear root. However, since the human head has many shapes and sizes, body 14 does not necessarily contact the ear root. Rather, it can be designed to have a shape such that it will, at least on most heads, contact the outer ear and/or the portion of the head that abuts the outer ear near the top of the ear. The arm distal end contacts the outer ear and/or the portion of the head that abuts the outer ear at the bottom of the ear. Since the contact of the audio device with the ear/head occurs at least at these two spaced locations, which are substantially or generally diametrically opposed, the result is a gripping force that maintains audio device 10 on the head as the head moves. A compliance of the arm can cause a slight compressive force at the opposed contact locations and so can lead to a grip on the head/ear that is sufficient to help retain the device in place on the head/ear as the head is moved. In one non-limiting example, one contact location is proximate the upper portion of the outer ear helix, and the opposed contact location is proximate the lower part of the ear or abutting head, such as near the otobasion inferius 26. In one non-limiting example, the opposed contact location is in or proximate the ear root dimple 25 that is located in most heads very close to or abutting or just posterior of the otobasion inferius 26. The audio device may be compliant at the portions that define one expected ear/head contact location or each of two (or more) expected contact locations. For example, the audio device may include a compliant section at the contact location proximate the upper portion of the outer ear helix.

Audio device body 14 is preferably but not necessarily compliant. Arm 18 is coupled to body 14 (e.g., to body portion 16) via integral arm sleeve 20 that encircles some or all of body portion 16 and is configured to grip the body, e.g., with an interference fit or using another mechanical structure. Arm 18 may be configured to be moved relative to body 14, and to bend. These movements and adjustments of arm 18 relative to body 14 allow arm distal end portion 19 to be located where desired relative to body 14. This allows distal end 19 to be located in the ear root dimple. This also allows for a desired (and variable) clamping force of audio device 10 on the head and/or ear.

Audio device body 14 can at least in part generally follow the shape of the ear root. The anatomy of the ear and head adjacent to the ear, and manners in which an audio device can be carried on or near the ear, are further described in international patent application PCT/US18/51450 filed on Sep. 18, 2018, the entire disclosure of which is incorporated herein by reference for all purposes. Accordingly, not all aspects of the anatomy and fitting of an audio device to an ear are specifically described herein. Body 14 in this example includes generally "C"-shaped portion 15 that extends from an upper end (proximate otobasion superius 22) where it is coupled to acoustic module 12, to a lower end where it is coupled to lower body portion 16. Some or all of portion 14 can be but need not be compliant. Compliance can be accomplished in one or more know mechanical manners. Examples include the choice of materials (e.g., using compliant materials such as elastomers or spring steel or the like) and/or a construction to achieve compliance (e.g., including compliant joints in the construction). Generally, but not necessarily, body 14 (e.g., portion 15) follows the ear root from the otobasion superius 22 (which is at the upper end of the ear root) to about the otobasion posterius (not shown).

Arm distal end 19 can be constructed and arranged to fit into or near the dimple or depression 25 (i.e., the ear root dimple) that is found in most people behind earlobe 24 and just posterior of the otobasion inferius 26. Distal end 19 can be generally round (e.g., generally spherical as shown in the drawings) and preferably has an upper arc-shaped surface that provides for an ear root region contact location along the arc, thus accommodating different head and ear sizes and shapes. Arm distal end 19 can be made from or include a compliant material (or made compliant in another manner), and so it can provide some grip to the head/ear. Body portion 15 at or around the ear root region proximate the upper portion 23 of the outer ear helix (which is generally the highest point of the outer ear) can also have compliance, but does not require compliance in order for the audio device to grip the ear. Since ear portion 23 is generally diametrically opposed to ear root dimple 25 (and to device portion 19 which contacts the ear root dimple), device compliance at one or more points proximate these two locations will provide a gripping force that will tend to hold audio device 10 on the head/ear even as the head is moved.

Since the device-to-ear/head contact points are both in the vicinity of the ear root (proximate upper ear upper portion 23 and in the vicinity of ear root dimple 25), the contact points are generally diametrically opposed. The opposed compliances create a resultant force on the device (the sum of contact force vectors, not accounting for gravity) that lies about in the line between the opposed contact regions. In this way, the device can be considered stable on the ear even in the absence of high contact friction (which adds to stabilization forces and so only helps to keep the device in place). Contrast this to a situation where the lower contact region is substantially higher up on the back of the ear. This would cause a resultant force on the device that tended to push and rotate it up and off the ear. By arranging the contact forces roughly diametrically opposed on the ear, and by creating points of contact on either side of or over an area of the upper ear root ridge 23, the device can accommodate a wider range of orientations and inertial conditions where the forces can balance, and the device can thus remain on the ear.

Stability is in part accomplished by a top-to-bottom clamping force on the outer ear, due to generally diametrically opposed clamping forces at the ear root ridge proximate the upper portion of the helix and at the ear root dimple. Clamping force at the ear root ridge proximate the upper portion of the helix is accomplished in this non-limiting example by arc-shaped body portion 15 that at least in part can sit behind upper helix portion 23, typically against one or both of the outer ear and the portion of the head adjacent to the outer ear. In one non-limiting example, portion 15 can be made from an elastomer (such as a thermoplastic elastomer, a thermoplastic urethane, or a silicone), or another compliant material. Alternatively, compliance could be accomplished, if desired, in another manner such as with a spring, or a spring embedded in an elastomer. Other options to accomplish a desired compliance and clamping force would be apparent to those skilled in the field and are included within the scope of this disclosure.

In another non-limiting example, rather than arm 18 and its distal end 19, audio device body 14 may include a compliant member (which may be round or partially spherical, similar to the shape of arm distal end 19) but located at body distal end 17. This compliant member may be configured to rest in or near the ear root dimple 25. This would be an alternative manner of helping to create an anchor location for audio device body 14. The compliant member could be of varied shape, size, material and physical configuration. Gripping near the top of the pinna/ear root region can be but need not be accomplished by making the portion of audio device body 14 that is configured to contact this region of the head and/or the pinna somewhat compliant, a feature that is further described in the patent applications incorporated by reference.

In one non-limiting example audio device body 14 is configured to curve or otherwise change shape upon application of heat. The heat could, for example, be provided by external heating or by electrically-induced resistive heating. In other examples the shape, size, and/or length of body 14 can change upon application of the stimulus. A change in curvature can be from an initially straight configuration, or the curvature can be an additional curvature of an already-curved configuration. The curvature can cause audio device body 14 to conform more closely to the ear (e.g., to the general C-shape of the ear root). When the shape of audio device body 14 is changed such that it conforms more closely to the ear, audio device 10 is held more tightly on the ear and/or the head. This can help maintain audio device 10 in place on the ear and/or the head such that acoustic module 12 is held in place in the desired location front of tragus 27.

Figure 2A:
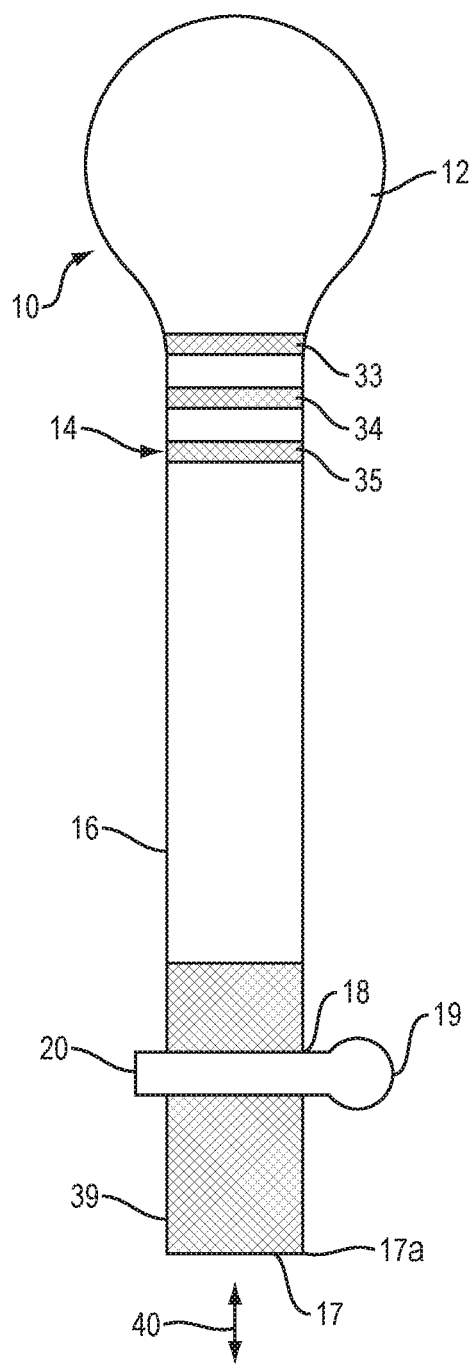
FIG. 2A shows the open audio device of FIG. 1 before it is fitted to an ear.
Figure 2B:
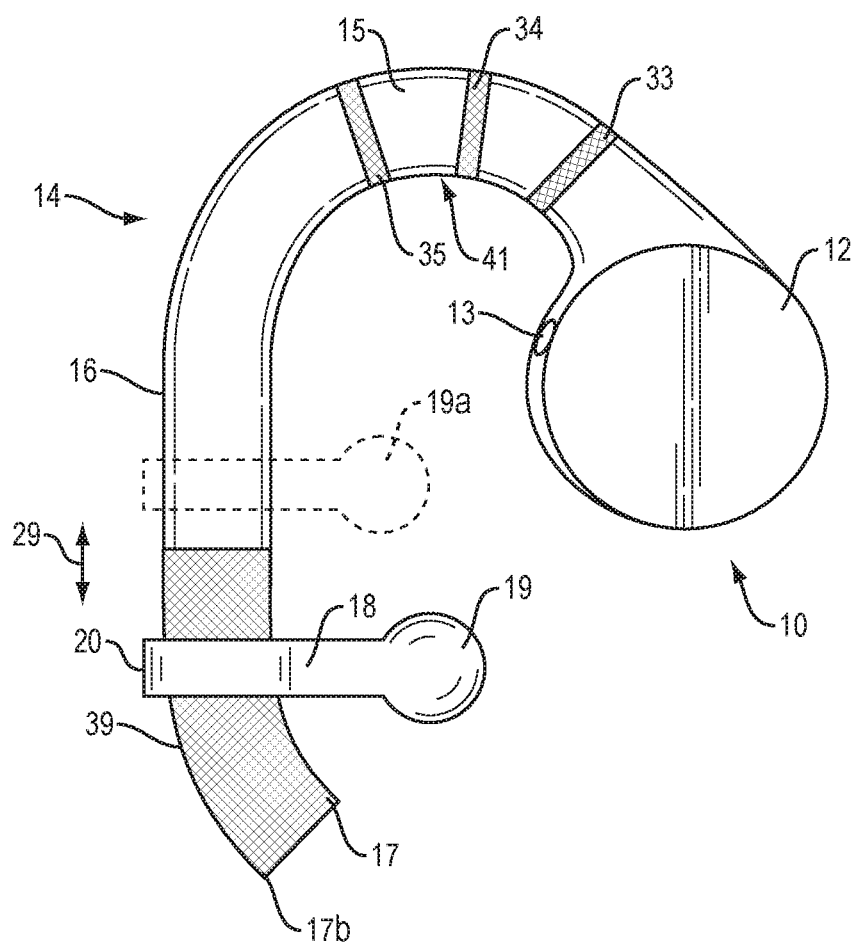
FIG. 2B shows the open audio device of FIG. 2A after it has been fitted to an ear.

FIGS. 2A and 2B illustrate audio device 10 with body 14 that carries acoustic module 12. The ear is not shown in FIG. 2B for purposes of clarity. Acoustic module 12 is generally but not necessarily carried on one end of body 14. In audio device 10, arm 18 terminal structure 19 can be configured to contact the lower part of the ear root, typically at or near the ear root dimple. Arm 18 may be fixed along the length of body 14 or may be movable along the length of the body, in order to adjust the position of terminal structure 19. Movement up and down in the direction of arrow 29 is indicated in FIG. 2B with positions 19 and 19*a*. If arm 18 is movable then the audio device may include some means of sensing its position, not shown. Sensing may be accomplished with capacitive sensors built into the body along the length of travel of the arm. Capacitive position sensing is well known in the technical field. Sensing arm position can be useful, for example in custom fitting of the audio device to an ear. In one non-limiting example, the audio device can be fitted onto an ear and the arm position adjusted to fit the particular ear. The fitted arm position can be sensed, and then it can be saved in memory. When the audio device is then later placed on the ear the arm's position can be recalled from memory and the arm can be moved to the properly-fitted position. Recall of the arm position from memory can be done automatically when the audio device is placed on the ear, for example using a different capacitive sensor to detect when the audio device touches skin. Alternatively or additionally memory recall can occur under user control, for example via a user interface (such as a button) on the audio device, or via a user interface on a smartphone app. Arm 18 and its distal end structure 19 are further described in the applications that are incorporated by reference herein.

Body 14 is configured to change shape upon the application of an electrically-induced stimulus. In one non-limiting example this shape change is accomplished using one or more portions of a shape-change material (e.g., a shape-memory alloy and/or a shape-changing polymer). The shape-change material may make up some or all of body 14. In this non-limiting example there are three separate portions of shape memory alloy 33, 34, and 35 at different locations along part of the length of body 14. Portions 33-35 are cross-hatched in the drawing so that they stand out. There is no particular quantity, size, shape, location, or configuration required of the one or more portion(s) of shape change material. Each of portions 33, 34, and 35 can contribute to a bending to the position shown in FIG. 2B. The electrically-induced stimulus can be separately applied to each of portions 33-35 or they can be stimulated together, depending on the degree of control and the shape(s) of the support structure that are designed into the support structure. Such control is further explained below. Note that the size, shape, location, quantity and material of any one or more portions of shape-changing material can be varied to achieve desired shape-changing goals of the support structure.

Additionally, terminal portion 39 of body 14 (and that carries arm 18) can be configured to change shape by expanding or contracting in the direction of arrow 40, and/or by bending. Portion 39 is cross-hatched in the drawing so that it stands out. There is no particular quantity, size, shape, location, or configuration required of the one or more portion(s) of shape change material. Expansion/contraction of portion 39 can be used to position arm 18 and its end 19 at different distances from the top portion 41 of body 14. See FIG. 2B. Since portion 41 is configured to contact the top part of the ear root, this variation in distance can be used to accommodate different ear anatomies that have different distances between the top of the ear root and the ear root dimple. In one non-limiting example terminal portion 39 is configured to change length by about 10-15 mm to thereby move end 17 from its initial position 17a (FIG. 2A) to its most extended position 17b (see FIG. 2B). This expansion may be designed to define one or more intermediate positions as well. For example, if there is one additional intermediate position (not shown) the device can define three arm positions that can be predetermined to accommodate small, medium, and large ears. Terminal portion 39 may additionally or alternatively be configured to curve such that end 17 is closer to acoustic module 12. See FIG. 2B.

Audio device 10 is configured such that an electrical stimulus can be applied to any one or all of portions 33-35 and 39, to heat the portion(s) and thus cause the desired shape and/or size change. One manner by which electrical stimulus is applied is further explained below. Shape-memory alloys are known in the field. They are typically designed to change shape when heated to at least a critical point. In some examples these materials can undergo deformation while at one temperature or temperature range (typically, any temperature below the transformation or transition temperature) and then will recover to their original un-deformed shape upon heating above the transformation or transition temperature. Materials other than alloys exhibit such temperature-related shape change characteristics and are contemplated for use in this disclosure. For example, shape-memory polymers are known in the field. Different shape change materials can be used together to achieve synergistic effects. For example, a shape memory polymer may encapsulate a shape memory alloy. If the materials have different transformation or transition temperatures, a first material (e.g., a shape memory polymer) can be used to help hold another material (e.g., an alloy) in an altered shape. The hold can be released by heating the first material to its transformation or transition temperature. As an alternative, a non shape memory polymer can encapsulate and help hold in place a shape memory alloy.

When materials that change shape upon heating or cooling are used in the present disclosure, they can be heated electrically, for example by resistance heating, and they can be cooled by the ambient temperature. For example, if the material will change shape when heated to at least a transformation temperature, the audio device can be configured to apply sufficient current to the material to resistively heat it at least to at least this temperature. The application of current can be constant (such as would occur with a simple on/off current application), or the current can be controlled, such as with the use of a sensor and a controller. These aspects of the disclosure are further described below. Resistive heating can be of the shape change material directly, or to a portion of the device that is adjacent to the shape change material and is able to transfer heat to the shape change material. Since shape memory alloys are metal alloys and are typically conductive, they typically would be able to be directly resistively heated.

The shape-change material is configured such that when it changes shape it causes the body 14 to change shape. In one non-limiting example the shape change is represented in FIG. 2B, where body 14 changes shape by curving into more of a "C" shape, as depicted, via shape changes of each of portions 33-35 and of portion 39. This "C" shape is more similar to the shape of a typical human ear root, and so this shape change typically results in audio device 10 being held more tightly on the ear/head as compared to the starting shape shown in FIG. 2A. Also, the shape change can be designed to snug member 19 into the ear root dimple, which further assists in holding the audio device on the ear. If the support structure is made from shape memory material then the shape change of the material directly equates to the shape change of the substrate. In cases where only part of the support structure comprises shape change material (such as depicted in FIGS. 2A and 2B), the relationship of the change in shape of the material to the change in shape of the support structure is indirect, but can be designed to achieve a desired support structure shape change result.

Figure 3:
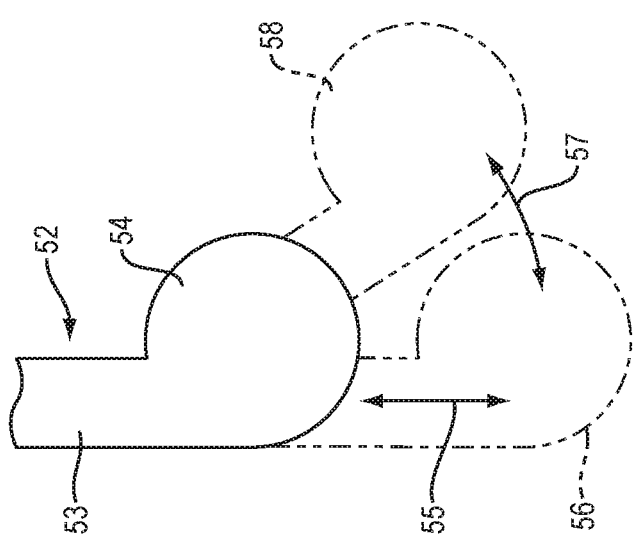
FIG. 3 illustrates an expansion and bending of an open audio device.

FIG. 3 depicts lower terminal portion 53 of audio device body 52. Note that body 52 is the same as or similar to body 14, FIGS. 1, 2A, and 2B. Several additional aspects of the audio device are illustrated; these can be used together, individually, or in different combinations. In this example, rather than an arm with a distal rounded portion that is configured to seat in the ear root dimple, body 52 comprises a rounded terminal portion 54 (similar to member 19 of FIG. 1). Body portion 53 is configured to expand and contract in the direction of arrow 55 as well as bend in and out in the direction of arrow 57. Shape change could be induced by applying two different combinations of trained shape memory alloys embedded inside a soft polymer. Each shape change material could be trained to a different shape/curvature, and be activated independently. Such multiple movements can be used individually or in combination to place portion 54 lower (as illustrated by extended position 56) and/or closer to the ear root (as illustrated by bent position 58). The combination of extension and bending may help accommodate more ear shapes and sizes.

Figure 4:
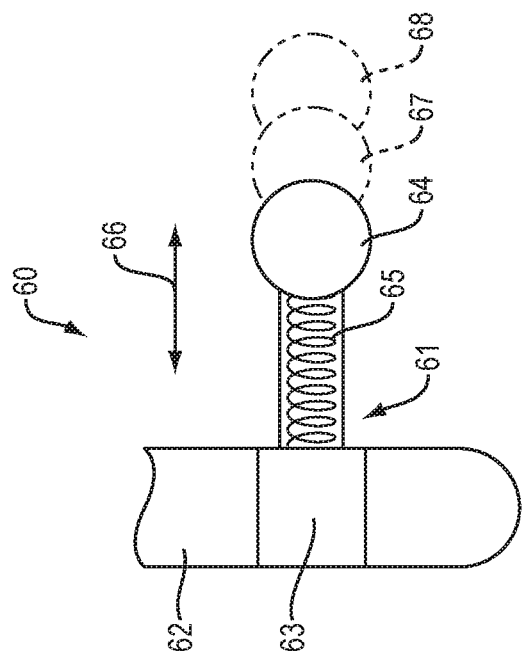
FIG. 4 illustrates an expansion of a stability arm of an audio device.

FIG. 4 depicts portion 62 of body 60 that carries arm 63 with terminal portion 64. Aspects illustrated in FIG. 4 include the use of shape changing materials in extending part 61 of arm 63 to cause it to lengthen and shorten in the direction of arrow 66, to the three positions 64, 67, and 68, illustrated. Note that there could be two or more predefined positions, or the movement could be defined only by its shortest and longest position, and the movement could be halted based on feedback from the device, for example based on sensed force, in order to snug end 64 into the ear without causing discomfort from too much pressure caused by too much lengthening of the arm. Also illustrated here is the use of an internal spring 65 that is made from or comprises a shape change material that causes the spring to expand and contract. The spring can be used to accomplish the lengthening/contraction of the arm, or can be used to assist a lengthening/contraction that is also in part caused by a shape change of the material from which the arm is made.

Figure 5:
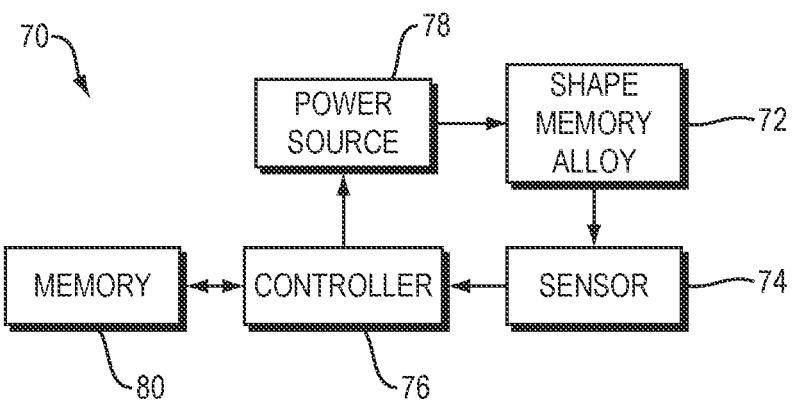
FIG. 5 is a block diagram of active elements of an audio device fitting system.

Audio device fitting system 70, FIG. 5, is a non-limiting example of a system that can accomplish and control the support structure shape change. Shape memory alloy block 72 represents the one or more portions of shape memory material that can be used in the audio device support structure to accomplish the shape change. Power source 78 (which may be a battery or another small self-contained power source when the audio device is configured to be used without being connected to a separate source of electrical power) is configured to provide power that is sufficient to accomplish the predetermined electrically-induced stimulus. For example, it may provide a current that is sufficient to resistively heat the shape memory alloy 72 to its transformation temperature. Controller 76 is configured to control the application of power by power source 78.

Sensor 74 (which is optional) can be configured to sense a property that is indicative of one or more of the shape of the support structure, the change in shape of the support structure, the electrically-induced stimulus, a current applied by power source 78, and a temperature (e.g., of the support structure or of the shape-memory material). Non-limiting examples of the types of sensors that can be used include but are not limited to a force sensor such as a force-sensitive resistor, an optical sensor, a capacitive sensor, a piezoelectric sensor, and an infrared sensor. A force-sensitive resistor may have a variable resistance that increases as force increases. A force-sensitive resistor can be configured to be in contact with the shape memory material, or with a support structure that includes the shape memory material. As the shape memory material changes shape, the force (stress) on the resistor changes. A circuit including the resistor can be used to determine the force, and infer support structure position. A piezoelectric sensor may work the same way, where its output is related to a stress applied to the piezoelectric material. An optical sensor (e.g., a visible light or infrared sensor) can be used for non-contact distance sensing, and so can be used to determine the support structure position. A capacitive sensor can be used to detect proximity or contact, for example to a conductive surface such as the user's skin. Capacitive sensors can be used to determine when the support structure contacts the user's ear and thus help define the final position of the support structure.

In some examples a memory 80 responsive to controller 76 is used. Memory may be used to store a determined stimulus that is to be applied in order to accomplish a shape change. For example, if the audio device has been properly fitted on a person the memory can store the operating parameter(s) (e.g., the current applied to a shape memory alloy) that achieves the fit. When the audio device is put on and the shape change is enabled, the controller can retrieve the stored value and command the power source to provide the correct current that will duplicate the fit. The shape change can be enabled in any desired manner, for example by including a switch (not shown) that turns the power on and off. The switch could be on the audio device, or on an app on a device such as a smartphone that is in communication with the audio device. There could be some means for detecting when the audio device is placed on the body, for example a capacitive sensor that senses when the support structure touches the skin. Then the stored operating parameter can be automatically retrieved and applied, such that the support structure automatically changes shape and fits to the body when the audio device is put on the body by the user. Also, there may be more than one fit on a person. For example there could be a "normal" fit mode and a "tight" fit mode. The normal fit may be more comfortable and typically used in situations where the user is not moving the head or body much. The tight fit may be considered akin to a "sport fit" for situations where the user is moving more, such as during exercise, and the audio device should be held more tightly to the head or ear in order to maintain it in a desired position. The shape change that is achieved for each mode would be predetermined and the necessary control parameter stored in memory. A user interface (not shown), such as control buttons on the audio device or that are part of a smartphone app can be used to allow the storage and retrieval of values from the memory.

Figure 6:
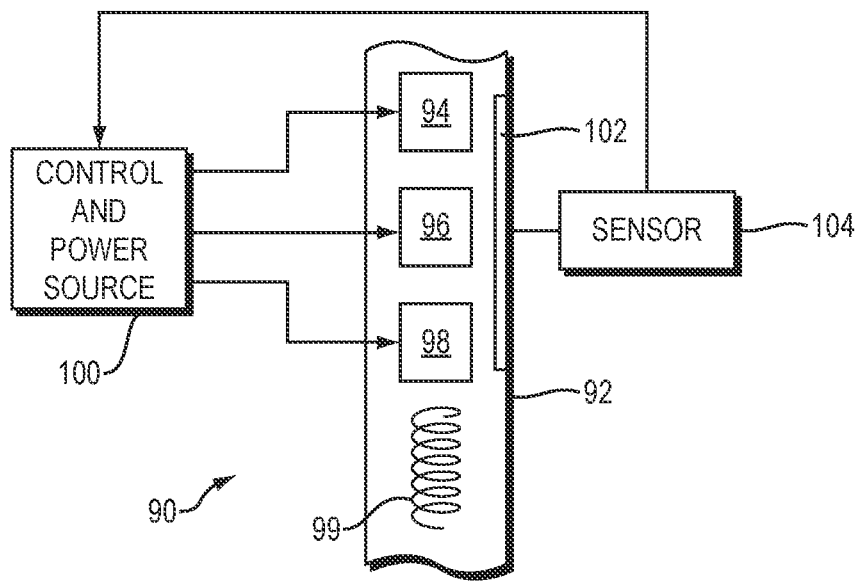
FIG. 6 illustrates control of multiple shape-changing elements.

FIG. 6 illustrates system 90 wherein there are multiple separately-controlled shape-changing structures or elements 94, 96, and 98 embedded in portion 92 of an audio device support structure. Note that there could be one, or more, shape-changing structures. Including multiple separately controlled shape change structures allows more control over the amount of and locations of the changes in shape of the support structure. Several separate shape change element's in series may result in greater expansion or curvature of the support structure in the region that includes these elements. Electrical current used to heat each of the structures to the point where they change shape is applied by control and power source element 100. Control and power source element 100 is responsive to sensor 104, which is represented in this schematic diagram as sensing device 102 that is in contact with support structure portion 92, and sense block 104 that receives and processes the output of sensing device 102 and provides its output to the controller. Sensing device 102 can be any one or more of the sensor types discussed above. In one example sensing device 102 is a force-sensitive resistor that is located on or in the support structure such that the stress on the resistor changes as the shape of support structure portion 92 changes. The resistance is determined by "sensor" 104 and/or control and power source 100. From this the shape or the shape change can be determined.

The shape change of the support structure can include one or more of a change in the curvature, length, or width of the support structure. Spring 99 is included to illustrate one aspect of an optional length change feature. The quantity, type, location and effect of any springs can be varied to achieve a desired result. For example, spring 99 can be enabled to assist with a length expansion of the region of the support structure that includes the spring.

Figure 7:
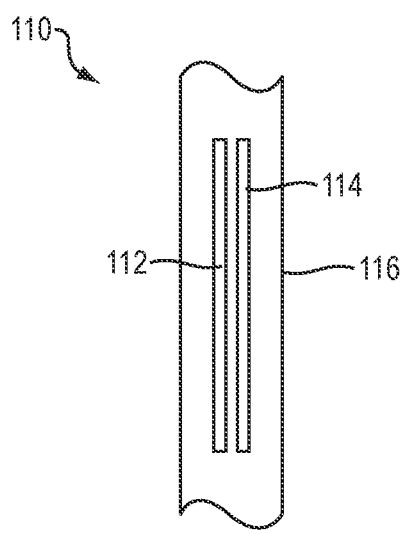
FIG. 7 illustrates a shape-changing element that can bend in two directions.

Shape-change materials can also be configured to achieve multiple altered configurations. For example, opposed shape-change elements 112 and 114 in support structure 116 of an audio system 110, FIG. 7, can be configured to bend in opposite directions. Separate control of the means of application of the electrically-induced stimulus to each of elements 112 and 114 (such as described above) allows support structure 116 to achieve two separate bent states, e.g., one bent to the right and one bent to the left. This disclosure contemplates using two or more shape-change elements arranged in any manner (e.g., side-by-side or end-to-end) and controlled separately or together, to achieve a desired change of shape of the audio device support structure.

Figure 8:
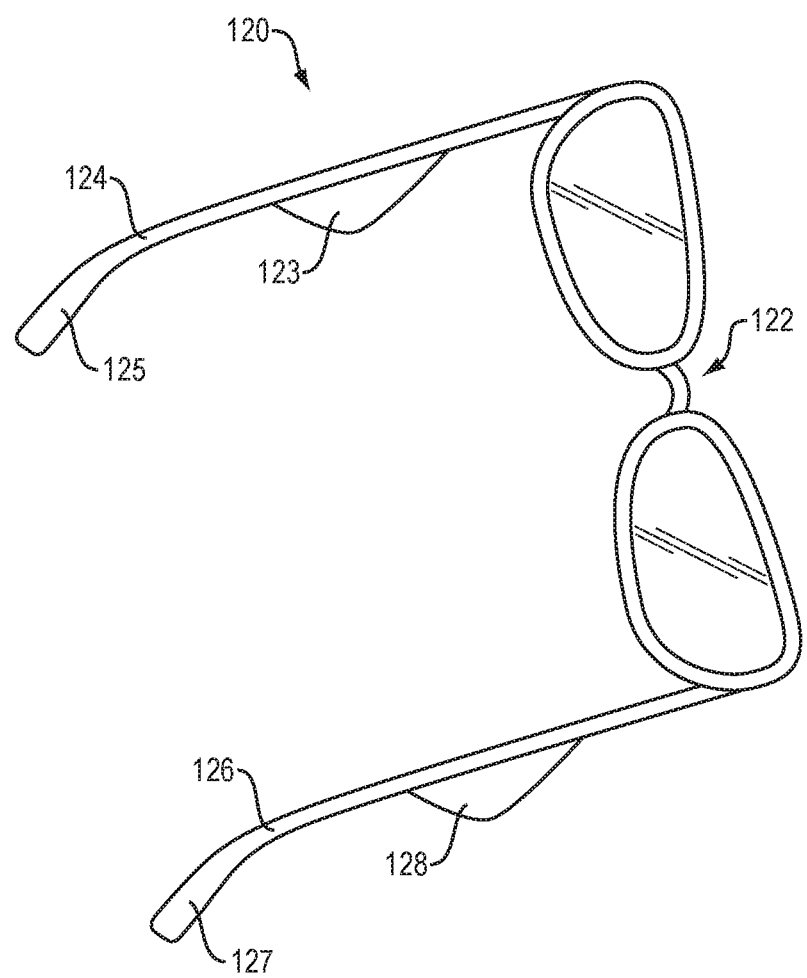
FIG. 8 illustrates open-audio eyeglasses.

As referred to above, the support structure will typically be configured to be carried on the body of the user. An additional non-limiting example of a support structure is the eyeglass frame 120, FIG. 8. Frame 120 comprises bridge 122 that is configured to sit on the nose, and temple pieces 124 and 126 that are configured to sit on or near the left and right ears, typically with distal ends 125 and 127 against the head near an ear. Portions 123 and 128 each carry an electro-acoustic transducer (not shown) that projects sound toward an ear. Eyeglass audio devices of this type are known in the field, such as the Bose® Frames audio sunglasses available from Bose Corporation, Framingham, Mass., USA. The shape and/or length of the bridge and/or the temple pieces can be changed using shape change material. As one non-limiting example, the temple pieces could be configured to bend in, so that the frames would hold more tightly on the head.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A wearable audio device, comprising:
    a body configured to be worn on or abutting an outer ear of a user, wherein the body is configured to contact at least one of the outer ear and the portion of the head that abuts the outer ear, wherein the body comprises at least at a first portion proximate the upper region of the outer ear helix and a second portion that lies along an axis and is proximate the otobasion inferius, and wherein at least one of the first and second portions of the body are configured to change shape upon application of a predetermined stimulus, wherein the body further comprises a protrusion that is configured to contact an ear root dimple of the user that is adjacent to and posterior to the otobasion inferius, wherein the protrusion comprises shape memory material that is configured to cause the protrusion to extend and retract at an angle to the main body axis, to move the protrusion toward and away from the ear root dimple; and
    an acoustic module carried by the body and configured to locate a sound-emitting opening proximate the user's ear when the body is worn on or abutting the ear of the user.

2. The wearable audio device of claim 1, wherein the body is configured to contact the back of a pinna of the user.

3. The wearable audio device of claim 1, wherein the body has a predefined maximum shape change.

4. The wearable audio device of claim 1, further comprising a control system that is configured to control the application of an electrically-induced stimulus to the body.

5. The wearable audio device of claim 4, wherein the control system comprises a control loop comprising a sensor and a controller, responsive to the sensor, for controlling the application of the electrically-induced stimulus to the body.

6. The wearable audio device of claim 5, wherein the sensor is selected from the group of sensors consisting of a force sensor, a capacitive sensor, a current sensor, an optical sensor, and an infrared sensor.

7. The wearable audio device of claim 5, further comprising a memory for storing a determined electrically-induced stimulus.

8. The wearable audio device of claim 1, wherein the shape memory material is configured to change shape upon the application of heat.

9. The wearable audio device of claim 8, wherein heat is applied to the shape memory material by resistive heating.

10. The wearable audio device of claim 8, wherein each of the first and second portions of the body comprise shape memory material.

11. The wearable audio device of claim 8, further comprising a spring that is configured to have an effect on the shape change.

12. The wearable audio device of claim 8, wherein the shape memory material comprises at least one of a shape memory metal alloy and a shape memory polymer.

13. The wearable audio device of claim 12, wherein a polymer encapsulates at least some of the shape memory alloy, to help retain a support structure shape.

14. The wearable audio device of claim 8, wherein the shape memory material comprises both a shape memory metal alloy and a shape memory polymer.

15. The wearable audio device of claim 1, wherein the protrusion is coupled to a support structure that is configured to be moved along a length of the second portion of the body.

16. The wearable audio device of claim 15, further comprising a sensor that is configured to determine a position of the support structure relative to the body.

17. The wearable audio device of claim 16, wherein the sensor comprises a capacitive-based position-sensing device.

18. A wearable audio device, comprising:
a body configured to be worn on or abutting an outer ear of a user, wherein the body is configured to contact at least one of the outer ear and the portion of the head that abuts the outer ear, wherein the body comprises at least at a first portion proximate the upper region of the outer ear helix and a second portion that lies along an axis and is proximate the otobasion inferius, and wherein at least one of the first and second portions of the body comprises a shape memory material that is configured to change shape upon the application of heat, wherein the body further comprises a protrusion that is configured to contact an ear root dimple of the user that is adjacent to and posterior to the otobasion inferius, wherein the protrusion comprises shape memory material that is configured to cause the protrusion to extend and retract at an angle to the main body axis, to move the protrusion toward and away from the ear root dimple;
an acoustic module carried by the body and configured to locate a sound-emitting opening proximate the user's ear when the body is worn on or abutting the ear of the user; and
a control system that is configured to control the application of an electrical current to the shape memory material, to cause resistive heating of the shape-memory material.

* * * * *